Patented May 27, 1941

2,243,513

UNITED STATES PATENT OFFICE 2,243,513

METHOD OF MAKING A SPARKLING SAKE-LIKE BEVERAGE

Katsuichiro Takakishi, Honolulu, Territory of Hawaii

No Drawing. Application July 25, 1938, Serial No. 221,234

1 Claim. (Cl. 99—35)

My invention relates to the art of making champagne and more particularly to a method of making champagne from sake or the like.

One of the principal objects of my invention is to provide a method of treating sake or the like in a manner to produce champagne therefrom.

Another object of my invention is to vary the usual method of making sake in a manner whereby the resultant sake can be further treated to produce a champagne which has combined therein the aroma, taste, activation and appearance of grape champagne.

A further object of my invention is to provide a method of the above described character which is both simple and economical in manufacture.

Other objects and advantages will be apparent from the description of the method and the annexed claim.

Ordinarily, sake is brewed by fermenting rice and usually contains approximately 17% alcohol and also considerable amounts of fat, protein, and inorganic substances which initially cluster on the outer surface of the rice grain thereby producing in the finished product an appreciable amount of fusel oil.

In the ordinary method of manufacturing sake, the mixture or brew is allowed to age in wooden tanks or vats which impart to the finished product a woody taste which, together with the taste of fusel oil, necessitates sake being heated to make it palatable for use.

One of my initial steps in the manufacture of champagne from sake is to somewhat vary the method of making the sake and this consists of polishing off to an appreciable degree, for instance from 40% to 50%, the rice grains or kernels employed and which operation results in most of the fat, proteins and inorganic substances, which originally adhere to the outer surfaces of the rice grains, being removed from the grains and thus reducing to a minimum the pigment and fusel oil from the finished product. Furthermore, during the brewing process I employ porcelain lined tanks, instead of the ordinary wooden tanks for that purpose, and thereby eliminate the wood aroma from the finished product.

When sake thus brewed has been fully aged, activated carbon is added and the pigment, stench and foreign tastes extracted. The product thus produced is a highly refined sake having a specific gravity of 1.005 to 1.010 and containing 16% to 18% alcohol and 7% to 10% extractives comprising 3% to 5% sugar, 2% dextrin, 1% glycerin, 0.5% amino acids and 0.1% lactic and succinic acids.

To the sake thus refined I add an adequate amount of sugar, white wine and other extracts and finally carbonic acid gas, which results in champagne.

Champagne thus produced combines the smell or aroma, taste and appearance of grape champagne. Furthermore, champagne thus produced contains approximately 10% to 15% alcohol, 6% to 8% extractives and 0.1% organic acids (lactic and succinic).

From the foregoing it will be apparent that I have provided a simple and economical method of making champagne from sake or the like and that the champagne thus produced comprehends all the attractive qualities of grape champagne, for instance aroma, taste, appearance and activation.

What I claim is:

A method of making sparkling beverage consisting of polishing off between 40% and 50% of the outer surfaces of the rice grains used in the brewing of sake to remove fat proteins and inorganic substances, brewing said rice grains, aging said brew to produce a sake-like beverage, treating the aged sake-like beverage with activated carbon, adding to the sake-like beverage thus obtained sugar and white wine to form a mixture, and supersaturating the product with gaseous carbon dioxide.

KATSUICHIRO TAKAKISHI.